United States Patent
Yanazume et al.

(10) Patent No.: US 9,756,302 B2
(45) Date of Patent: Sep. 5, 2017

(54) MULTI-PROJECTION SYSTEM AND DATA PROCESSING APPARATUS

(71) Applicants: Shinsuke Yanazume, Kanagawa (JP); Hiroshi Baba, Kanagawa (JP)

(72) Inventors: Shinsuke Yanazume, Kanagawa (JP); Hiroshi Baba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 115 days.

(21) Appl. No.: 14/989,915

(22) Filed: Jan. 7, 2016

(65) Prior Publication Data
US 2016/0227179 A1 Aug. 4, 2016

(30) Foreign Application Priority Data
Jan. 29, 2015 (JP) ................... 2015-016042

(51) Int. Cl.
*H04N 9/31* (2006.01)
*G06F 3/14* (2006.01)

(52) U.S. Cl.
CPC ......... *H04N 9/3185* (2013.01); *G06F 3/1423* (2013.01); *G06F 3/1446* (2013.01); *H04N 9/3147* (2013.01); *G09G 2300/026* (2013.01)

(58) Field of Classification Search
CPC ............... H04N 9/3185; H04N 9/3147; G09G 2300/026; G03B 21/14
See application file for complete search history.

(56) References Cited

U.S. PATENT DOCUMENTS

| | | | |
|---|---|---|---|
| 7,002,589 B2 * | 2/2006 | Deering | G06T 3/0081 345/581 |
| 2008/0002160 A1 * | 1/2008 | Chang | G06T 5/006 353/94 |
| 2008/0024469 A1 * | 1/2008 | Damera-Venkata | H04N 9/3147 345/204 |
| 2008/0101725 A1 * | 5/2008 | Lin | G06K 9/3216 382/286 |
| 2014/0043361 A1 | 2/2014 | Mukasa | |
| 2014/0354674 A1 * | 12/2014 | Okamoto | G09G 5/02 345/590 |
| 2015/0213584 A1 * | 7/2015 | Ishikawa | G06F 3/1446 345/637 |

(Continued)

FOREIGN PATENT DOCUMENTS

| | | |
|---|---|---|
| JP | 2008-107477 | 5/2008 |
| JP | 2014-038159 | 2/2014 |

*Primary Examiner* — William C Dowling
(74) *Attorney, Agent, or Firm* — IPUSA, PLLC

(57) ABSTRACT

A multi-projection system configured to display output frames as a single screen by display frames displayed by display devices, respectively, the system includes a screen position setting unit that sets output frame position data that is data of position of each of the output frames in the single screen when synthesizing the output frames to the single screen, and display frame position data that is data of position of each of the display frames in the single screen; an output frame obtaining unit that obtains output frames; an output frame synthesizing unit that synthesizes the output frames based on the output frame position data; a display frame generating unit that generates the display frame for each of the display devices using a part of the synthesized image based on the display frame position data; and display units that display the generated display frames, respectively.

11 Claims, 17 Drawing Sheets

(56) References Cited

U.S. PATENT DOCUMENTS

2016/0267878 A1\* 9/2016 Maeda ................. H04N 9/3147
2016/0295184 A1\* 10/2016 Ishikawa .............. H04N 9/3147
2017/0127028 A1\* 5/2017 Oike .................... H04N 9/3147
2017/0180689 A1\* 6/2017 Morrison ............. H04N 9/3185

\* cited by examiner

FIG.3A

| OUTPUT FRAME | DATA TERMINAL | POSITION/RANGE |
|---|---|---|
| OUTPUT FRAME 1 | (192.168.10.10) | (0,0),(1920,1080) |
| OUTPUT FRAME 2 | (192.168.10.20) | (1921,0),(3840,1080) |
| OUTPUT FRAME 3 | (192.168.10.30) | (3841,0),(5760,1080) |
| ⋮ | ⋮ | ⋮ |

FIG.3B

| DISPLAY FRAME | DISPLAY DEVICE | POSITION/RANGE |
|---|---|---|
| DISPLAY FRAME 1 | (192.168.11.10) | (0,0),(2900,1080) |
| DISPLAY FRAME 2 | (192.168.11.20) | (2861,0),(5760,1080) |
| ⋮ | ⋮ | ⋮ |

FIG.3C

| OUTPUT FRAME | DATA TERMINAL | CONTENT KIND | UPDATE FREQUENCY |
|---|---|---|---|
| OUTPUT FRAME 1 | (192.168.10.10) | DYNAMIC IMAGE | 30 TIMES / SECOND |
| OUTPUT FRAME 2 | (192.168.10.20) | JPEG FILE SLIDE TRANSITION | 0.2 TIMES / SECOND |
| OUTPUT FRAME 3 | (192.168.10.30) | JPEG FILE SLIDE TRANSITION | 0.2 TIMES / SECOND |
| ⋮ | ⋮ | ⋮ | ⋮ |

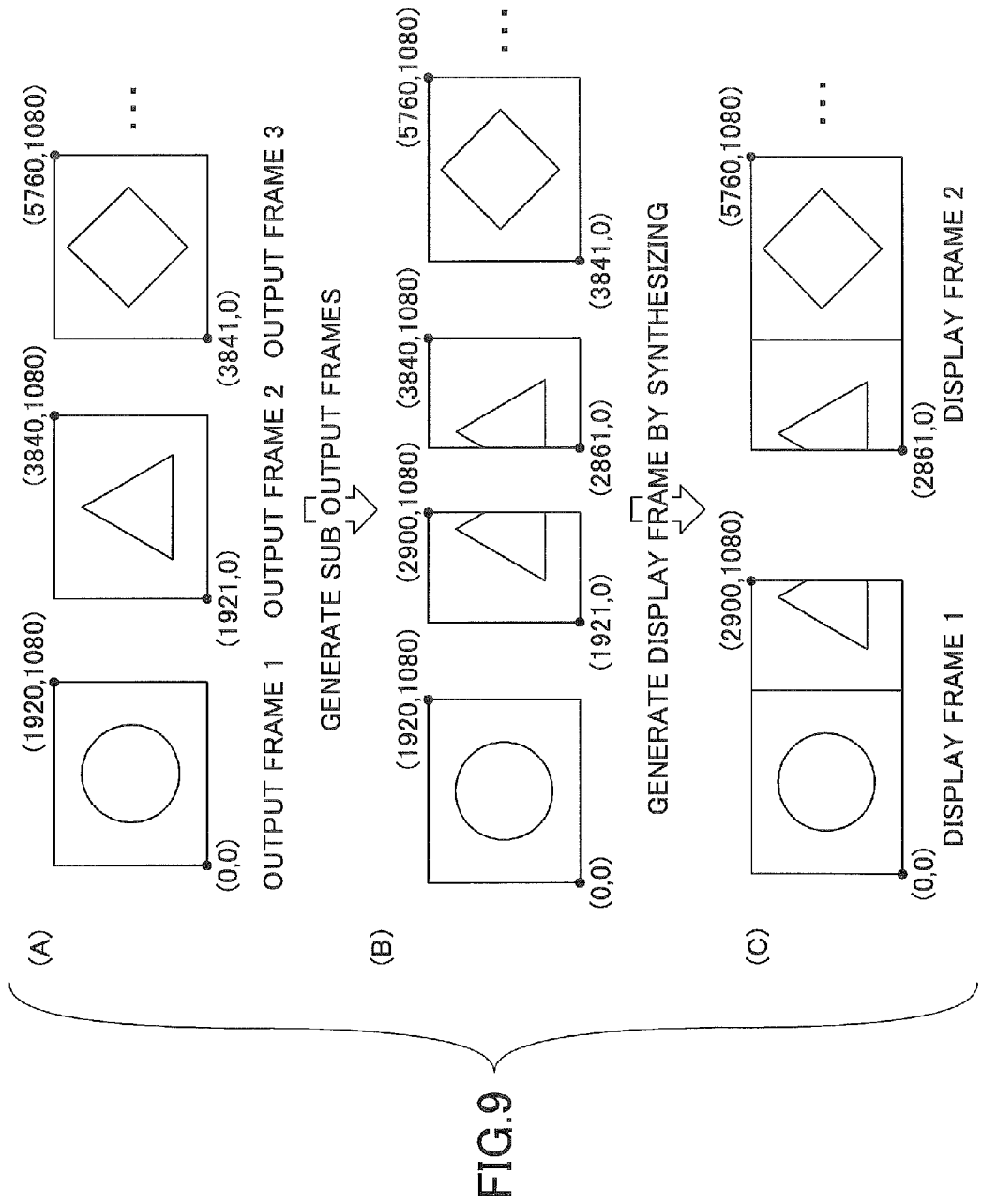

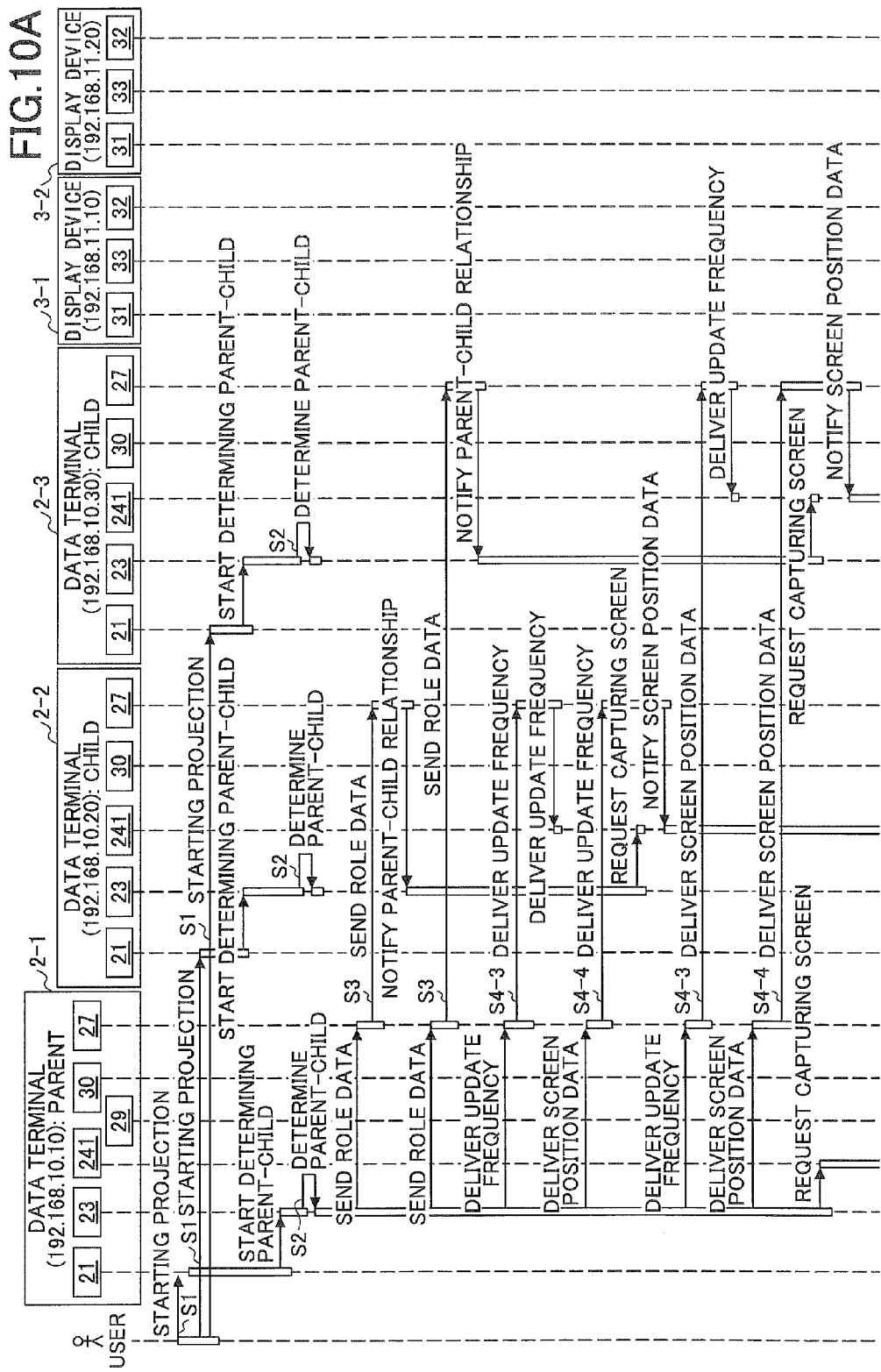

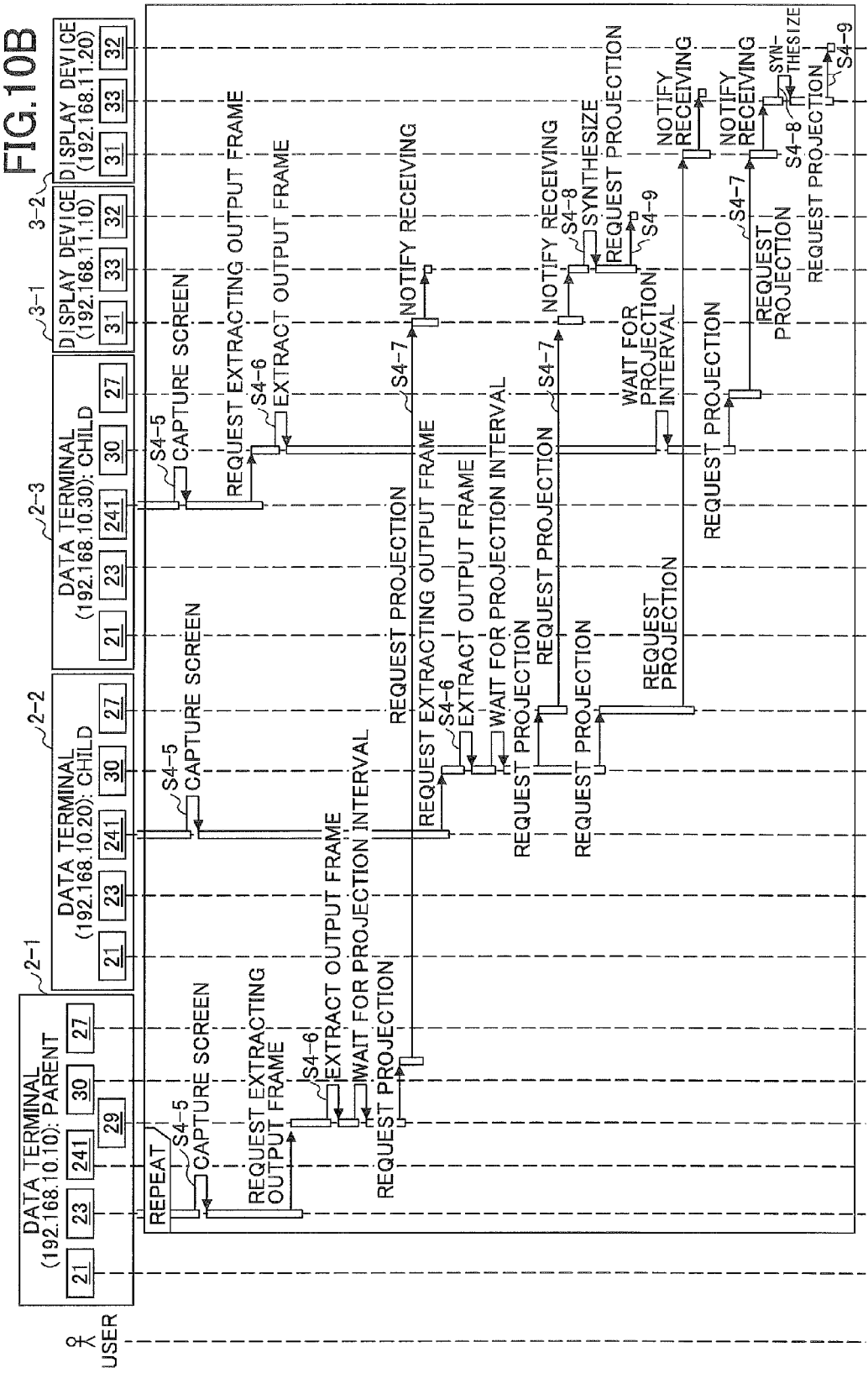

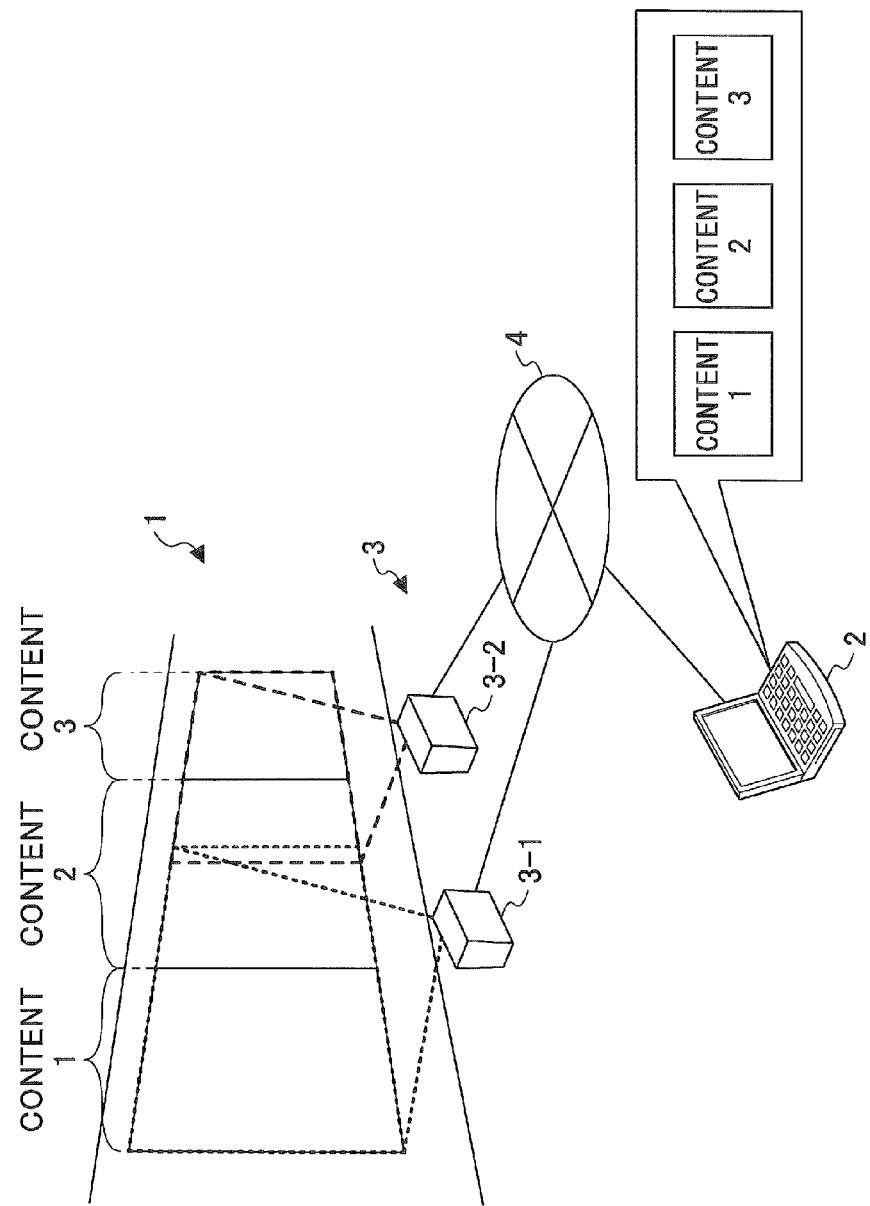

MULTI-PROJECTION SYSTEM AND DATA PROCESSING APPARATUS

BACKGROUND OF THE INVENTION

1. Field of the Invention

The present invention relates to a multi-projection system and a data processing apparatus.

2. Description of the Related Art

A multi-projection system is known in which a single data processing apparatus and a plurality of display devices such as projectors, liquid crystal displays or the like are connected via a wired vide cable, and contents output by the data processing apparatus are projected by the plurality of display devices as a single large screen. Further, in the multi-projection system in which projectors are used as the display devices, a process of providing an overlapping area for projections by the plurality of projectors is performed in order to smoothly display edges of images that are adjacent in an upper and lower direction or in a left and right direction. Such a multi-projection system is used for a digital signage, an electronic whiteboard or the like.

Patent Document 1 discloses a multi-projection system in which a plurality of data processing apparatuses and a plurality of display devices are respectively connected with each other in a one-to-one manner. In this multi-projection system, an image of a content that is previously stored in a memory of each of the data processing apparatuses is projected by the corresponding display device and a projected image from each of the display devices is aligned on a screen while a part of the projected image being overlapped so that a screen such as a menu or the like is displayed on the entirety of the screen as a single large screen.

However, according to the multi-projection system disclosed in Patent Document 1, it is necessary to connect the plurality of data processing apparatuses and the plurality of display devices in a one-to-one manner, and to previously store the content output by the display device in the memory of the corresponding data processing apparatus. Thus, it is impossible to display contents, as a single large screen, respectively output by a plurality of computers such as a desk top screen or the like that is currently displayed in each of the data processing apparatuses, by aligning by display devices the number of which is different from the number of data processing apparatuses.

PATENT DOCUMENT

[Patent Document 1] Japanese Laid-open Patent Publication NO. 2008-107477

SUMMARY OF THE INVENTION

The present invention is made in light of the above problems, and provides a multi-projection system capable of displaying dynamic contents respectively output by a plurality of data processing apparatuses as a single large screen even when the number of data processing apparatuses and the number of display devices are different.

A multi-projection system is provided in which output frames output by a plurality of data processing apparatuses are displayed as a single screen by display frames displayed by a plurality of display devices.

According to an embodiment, there is provided a multi-projection system configured to display a plurality of output frames as a single screen by a plurality of display frames displayed by a plurality of display devices, respectively, the system including a screen position setting unit that sets output frame position data that is data of position of each of the output frames in the single screen when synthesizing the output frames to the single screen, and display frame position data that is data of position of each of the display frames in the single screen; an output frame obtaining unit that obtains a plurality of output frames; an output frame synthesizing unit that synthesizes the plurality of output frames based on the output frame position data; a display frame generating unit that generates the display frame for each of the display devices using a part of the synthesized image based on the display frame position data; and a plurality of display units that display the plurality of generated display frames, respectively.

According to another embodiment, there is provided a multi-projection system configured to display a plurality of output frames as a single screen by a plurality of display frames displayed by a plurality of display devices, respectively, the system including a screen position setting unit that sets output frame position data that is data of position of each of the output frames in the single screen when synthesizing the output frames to the single screen, and display frame position data that is data of position of each of the display frames in the single screen; an output frame obtaining unit that obtains at least an output frame; a sub output frame generating unit that generates a plurality of sub output frames from the at least output frame to be divided into the plurality of display frames based on the output frame position data and the display frame position data, each of the sub output frames becoming a part of the respective display frame; a display frame generating unit that generates the display frame using the sub output frames that are to be included in the display frame; and a display unit that display the generated display frame.

BRIEF DESCRIPTION OF THE DRAWINGS

Other objects, features and advantages of the present invention will become more apparent from the following detailed description when read in conjunction with the accompanying drawings.

FIG. 3A to FIG. 3C are views illustrating an example of screen position data;

FIG. 9 is a view illustrating an example of the second embodiment in which display frames are generated from output frames;

FIG. 10A is a sequence diagram (No. 1) of the second embodiment;

FIG. 10B is a sequence diagram (No. 2) of the second embodiment;

FIG. 11 is a schematic view illustrating a multi-projection system of a third embodiment;

DETAILED DESCRIPTION OF THE PREFERRED EMBODIMENTS

Figure 1:
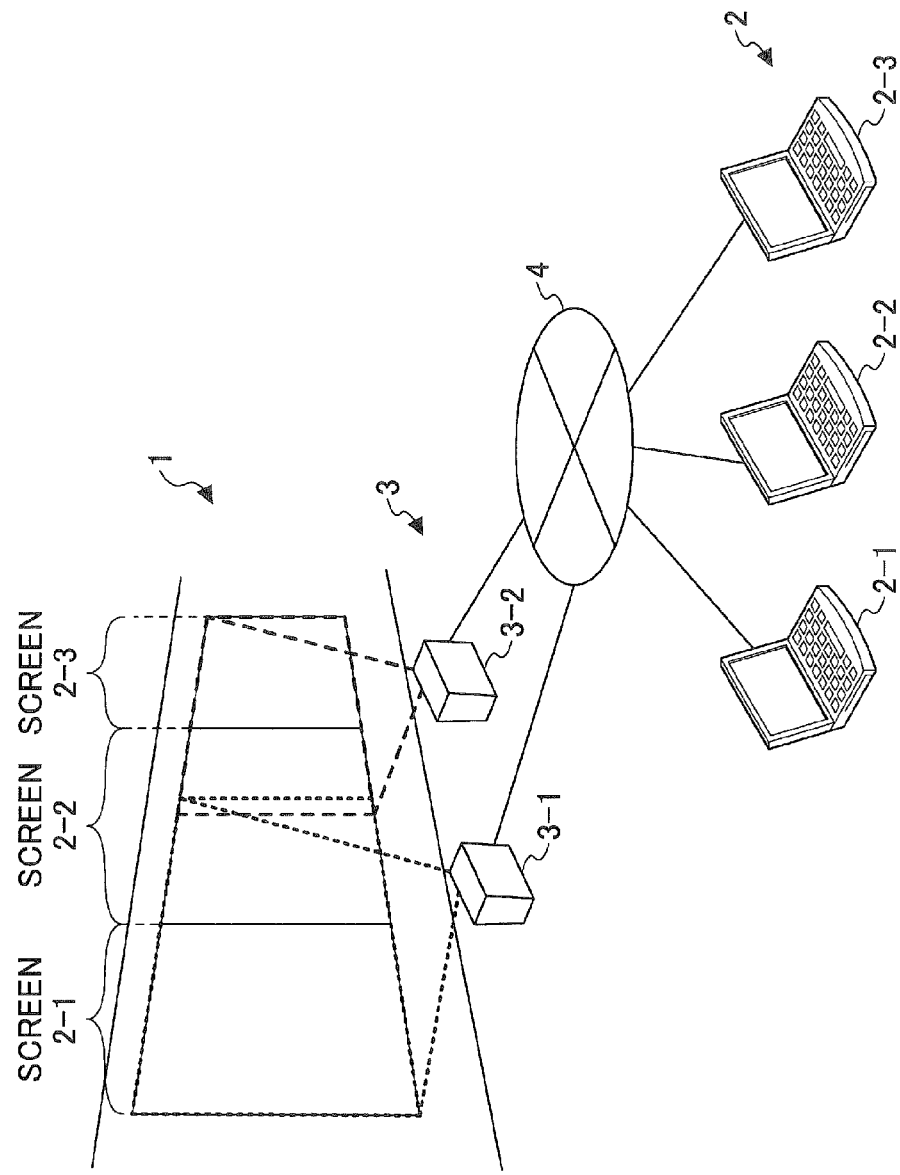
FIG. 1 is a schematic view illustrating a multi-projection system of a first embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

FIRST EMBODIMENT

FIG. 1 is a schematic view illustrating a multi-projection system 1 of the first embodiment. The multi-projection system 1 includes a plurality of data terminals 2 and a plurality of display devices 3 that are connected with each other via a network 4. FIG. 1 illustrates an example in which two display devices 3 (3-1 and 3-2) and three data terminals 2 (2-1, 2-2 and 2-2) are connected and screens displayed by the three data terminals 2, respectively are projected as a single large screen by the two display devices 3.

The technique of the embodiment is adaptable, not only for the case in which the number of the display devices 3 is less than the number of the data terminals 2, but also for a case in which the number of the display devices 3 and the number of the data terminals 2 are the same, or the number of the display devices 3 is greater than the number of the data terminals 2.

Figure 2:
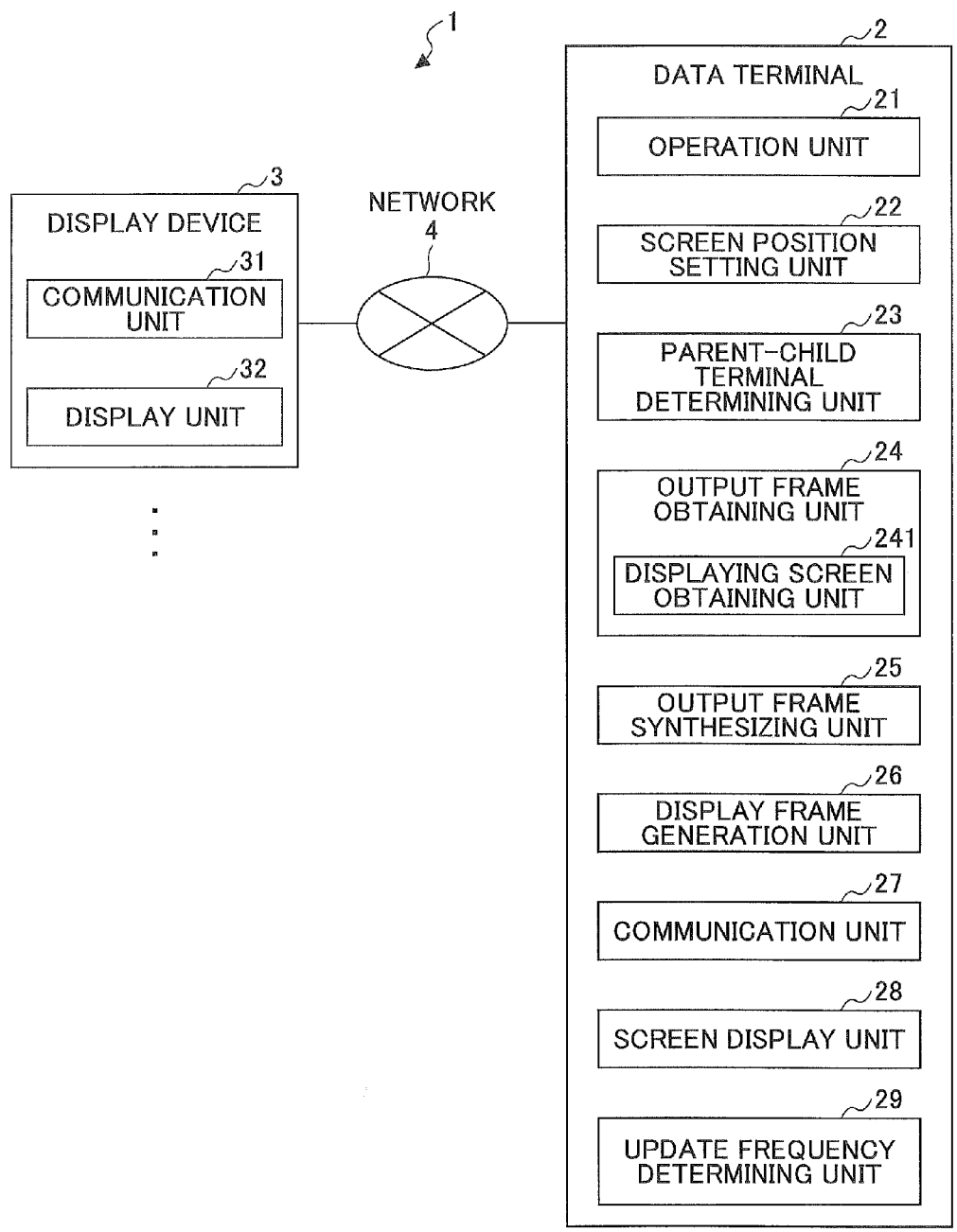
FIG. 2 is a view illustrating a structure of the multi-projection system of the first embodiment.

FIG. 2 is a view illustrating a structure of the multi-projection system 1 of the first embodiment.

Each of the data terminals 2 is a personal computer or the like in which a predetermined program is installed. Each of the data terminals 2 includes an operation unit 21, a screen position setting unit 22, a parent-child terminal determining unit 23, an output frame obtaining unit 24, an output frame synthesizing unit 25, a display frame generation unit 26, a communication unit 27, a screen display unit 28 and an update frequency determining unit 29.

The operation unit 21 accepts a request from a user and outputs the request to the parent-child terminal determining unit 23 or the like.

The screen display unit 28 displays a screen such as a user interface on the data terminal 2.

The parent-child terminal determining unit 23 determines a parent-child relationship between the data terminals 2 based on the input from the operation unit 21 or the input from the communication unit 27.

The output frame obtaining unit 24 includes a displaying screen obtaining unit 241 that captures and obtains a screen currently displayed by the screen display unit 28. The output frame obtaining unit 24 obtains an output frame by the function of the displaying screen obtaining unit 241.

The screen position setting unit 22 stores screen position data as illustrated in FIG. 3A, FIG. 3b and FIG. 3C. FIG. 3A to FIG. 3C are views illustrating an example of the screen position data. The position data includes output frame position data and display frame position data.

With reference to FIG. 3A, the screen position setting unit 22 stores output frame position data for each of output frames 1 to 3. Specifically, the screen position setting unit 22 stores, for each of the output frames 1 to 3, identification data such as IP address, host name or the like of the data terminal 2 that sends (outputs) the respective output frame, and output frame position data that includes positions of lower left and upper right pixels of the respective output frame in a single large screen projected by the plurality of display devices 3.

With reference to FIG. 3B, the screen position setting unit 22 stores display frame position data for each of display frames 1 to 2. Specifically, the screen position setting unit 22 stores, for each of the display frames 1 to 2, identification data such as IP address, host name or the like of the display device 3 to which the respective display frame is sent, and display frame position data that includes positions of lower left and upper right pixels of the respective display frame in the single large screen projected by the plurality of display devices 3.

With reference to FIG. 3C, the screen position setting unit 22 stores, for each of the output frames, the identification data such as IP address, host name or the like of the data terminal 2 that sends (outputs) the respective output frame, content kind of the respective output frame, and output frame update frequency data that indicates update frequency of the respective output frame.

Figure 4:
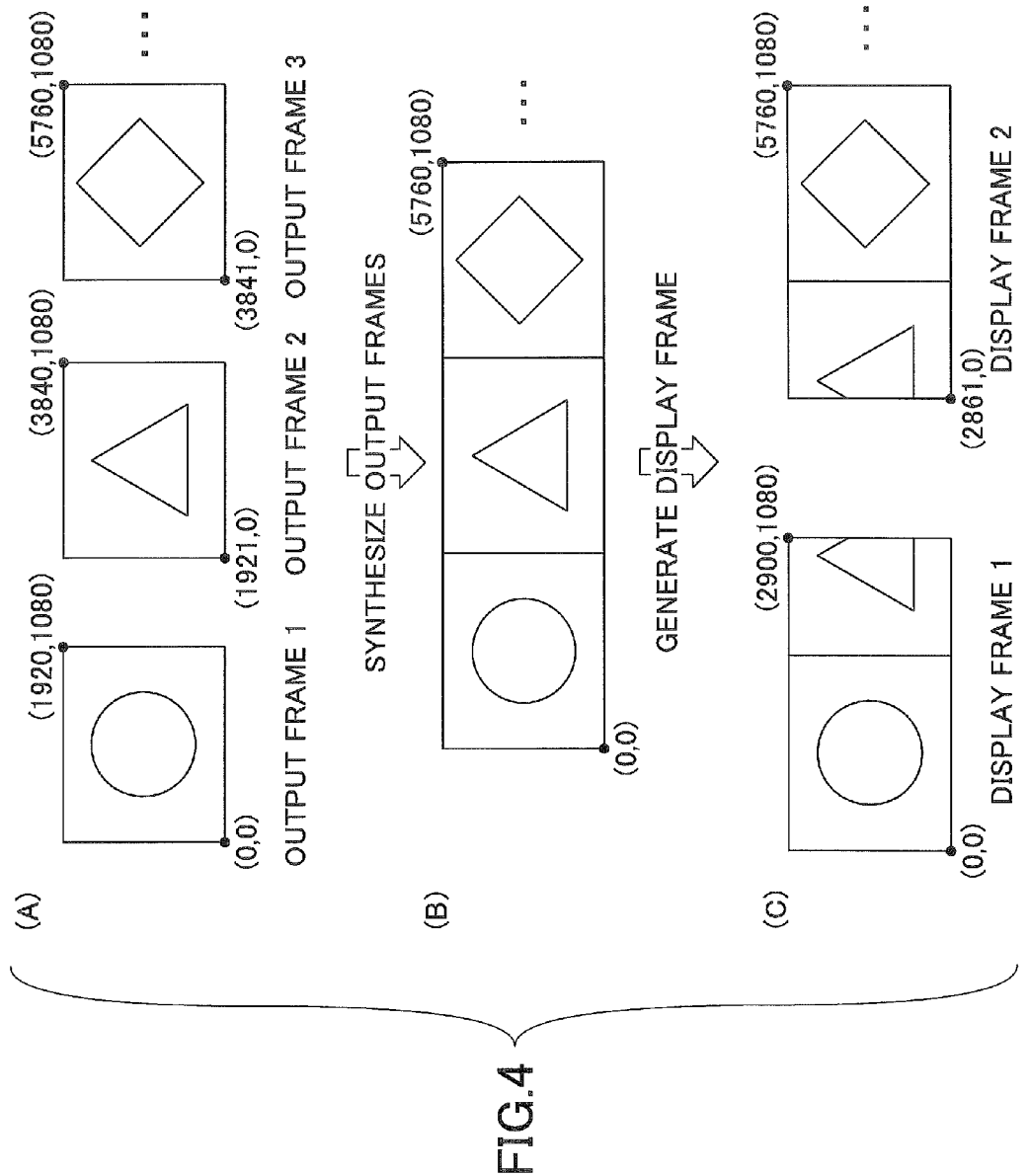
FIG. 4 is a view illustrating an example of the first embodiment in which output frames are synthesized and display frames are generated.

FIG. 4 is a view illustrating an example of synthesizing output frames and generating display frames.

For the example illustrated in FIG. 3B and FIG. 4, positions of lower left and upper right pixels of the display frame 1 are (0,0) and (2900,1080) and positions of lower left and upper right pixels of the display frame 2 are (2861,0) and (5760,1080). This means that 40 pixels of the image of the display frame 1 and the display frame 2 overlap in the lateral direction.

Referring back to FIG. 2, the update frequency determining unit 29 determines update frequency for each of the display frames based on the screen position data illustrated in FIG. 3A to FIG. 3C. Specifically, the following processes are performed for each of the display frames. The update frequency determining unit 29 determines one or more output frames included in the display frame based on a range of the display frame obtained from FIG. 3B and ranges of the output frames obtained from FIG. 3A. Then, the update frequency determining unit 29 sets the update frequency of the output frame whose update frequency is the highest among the one or more output frames included in the display frame from FIG. 3C as update frequency of the display frame.

For the example of FIG. 3A to FIG. 3C, the output frame 1 and the output frame 2 are included in the display frame 1, the update frequency of the output frame 1 is 30 times/second, and the update frequency of the output frame 2 is 0.2 times/second. Thus, the update frequency determining unit 29 determines the update frequency of the display frame 1 as 30 times/second. Similarly, the output frame 2 and the output frame 3 are included in the display frame 2, the update frequencies of the output frame 2 and the output frame 3 are both 0.2 times/second. Thus, the update frequency determining unit 29 determines the update frequency of the display frame 2 as 0.2 times/second, in other words, once per 5 seconds.

Here, instead of previously setting the data as illustrated in FIG. 3C and determining the update frequency for each of the display frames, the update frequency of each of the display frames may be previously set.

Referring back to FIG. 3, in accordance with the update frequency of each of the display frames, at timing (period) when the respective display frame is to be updated, the update frequency determining unit 29 notifies identification data of the respective display frame to the output frame synthesizing unit 25.

The output frame synthesizing unit 25 outputs an image to the display frame generation unit 26 in accordance with the update frequency of each of the display frames determined by the update frequency determining unit 29. Specifically, when the plurality of output frames are included in the respective display frame based on the screen position data set in the screen position setting unit 22 as illustrated in FIG. 3A and FIG. 3C, the output frame synthesizing unit 25 synthesizes the plurality of output frames into a single image as the image and outputs it to the display frame generation unit 26. When the display frame includes a single output frame, the output frame synthesizing unit 25 outputs the image of the output frame to the display frame generation unit 26.

The display frame generation unit 26 generates display frames from the image input from the output frame synthesizing unit 25 by cutting the image in accordance with the position of each of the display frames set in the screen position setting unit 22 as illustrated in FIG. 3B.

The communication unit 27 communicates with other data terminals 2. Here, it is assumed that the data terminal 2-1 is determines as a parent data terminal and the data terminals 2-2 and 2-3 are determined as child data terminals (see FIG. 1). The communication unit 27 of the parent data terminal 2-1 receives the output frame from each of the child data terminals 2-2 and 2-3. Further, the communication unit 27 of the parent data terminal 2-1 delivers each of the display frames generated by the display frame generation unit 26 to the corresponding display device 3.

The display device 3 is a projector, a liquid crystal display or the like, and includes a communication unit 31 and a display unit 32.

The communication unit 31 receives the display frame delivered from the data terminal 2.

The display unit 32 projects (displays) the display frame received by the communication unit 31.

Figure 5A:
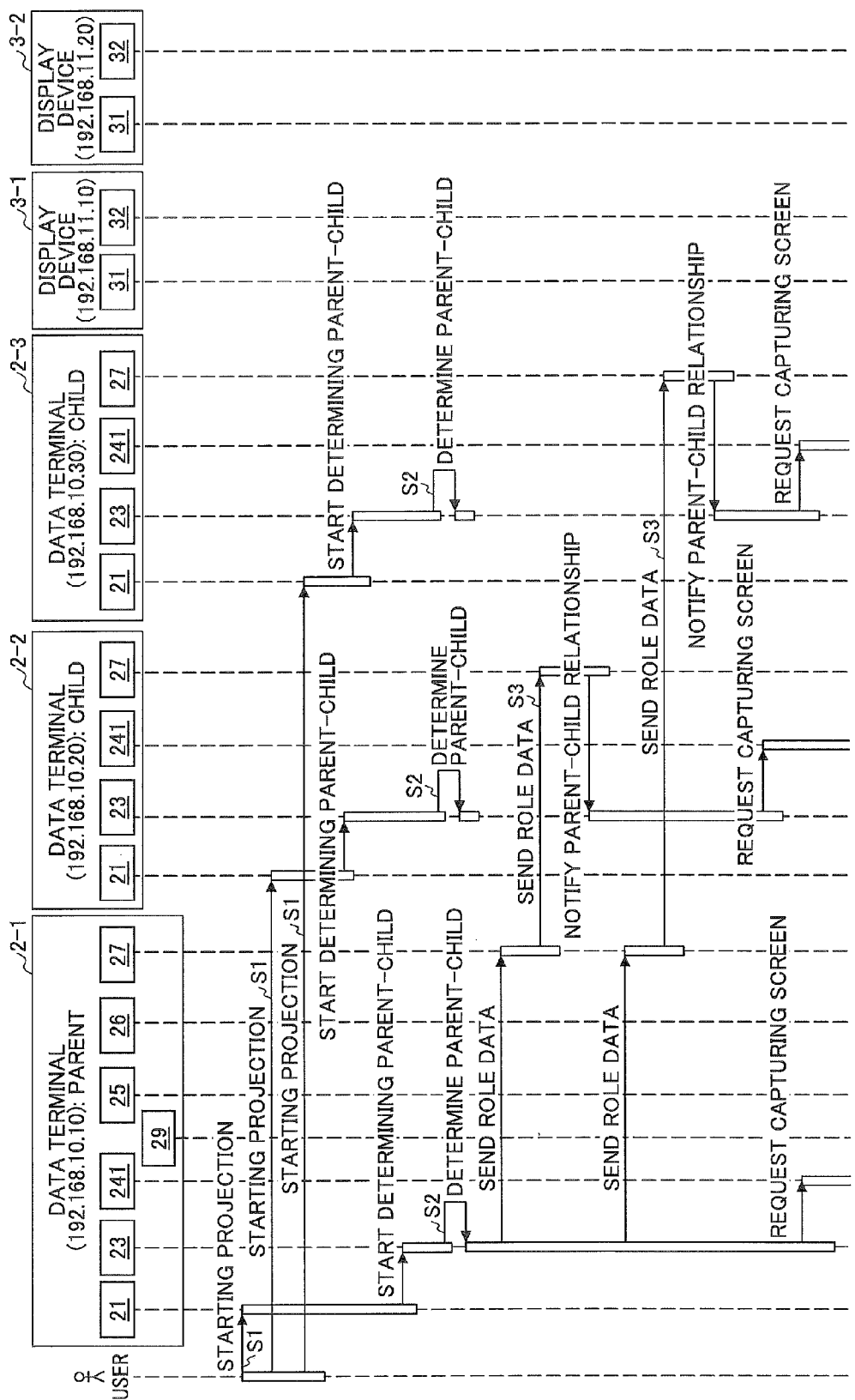
FIG. 5A is a sequence diagram (No. 1) of the first embodiment.
Figure 5B:
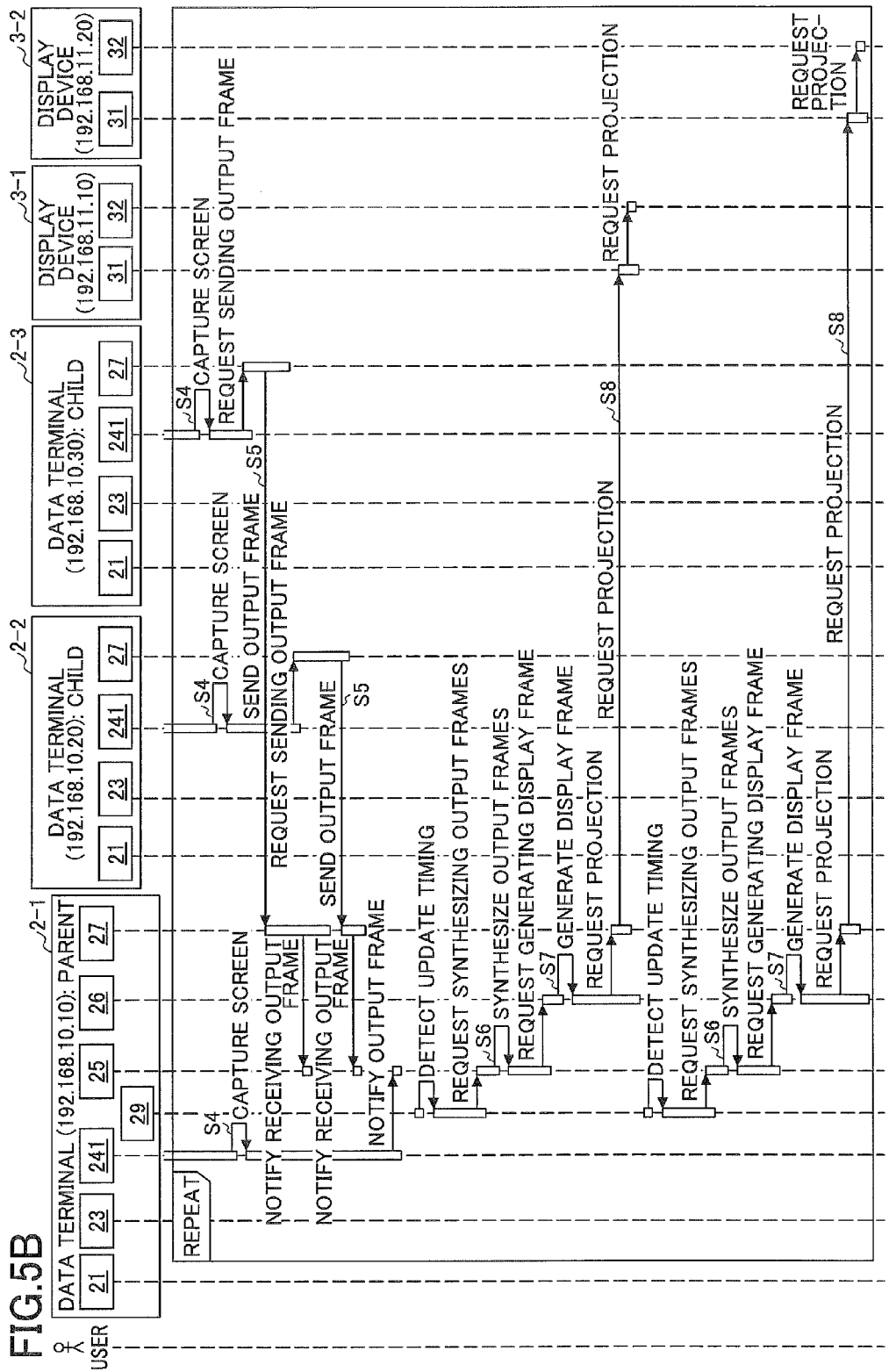
FIG. 5B is a sequence diagram (No. 2) of the first embodiment.

FIG. 5A and FIG. 5B are sequence diagrams of the multi-projection system 1 of the first embodiment. Although boxes of units are given only numerals and names of the units are not illustrated in the boxes in FIG. 5A and FIG. 5B, the boxes with numerals correspond to the units as illustrated in FIG. 2 and described in the specification.

With reference to FIG. 5A, first, when the operation unit 21 of each of the data terminals 2 accepts a request of starting projection from a user (step S1), the parent-child terminal determining unit 23 of each of the data terminals 2 determines a parent-child relationship between the data terminals 2 by processes illustrated in FIG. 6, which will be explained later (step S2).

Here, as described above, it is assumed that the data terminal 2-1 is determined as a parent terminal. The data terminal 2-1, whose parent-child terminal determining unit 23 determines that the data terminal 2-1 is the parent terminal, sends role data to each of the child data terminals 2-2 and 2-3 via the communication unit 27 (step S3). The parent-child terminal determining unit 23 of each of the child data terminals 2-2 and 2-3 grasps the parent-child relationship based on the role data received from the parent data terminal 2-1 via the communication unit 27.

With reference to FIG. 5B, in each of the data terminals 2, the displaying screen obtaining unit 241 captures a currently displayed screen (step S4). Each of the child data terminals 2-2 and 2-3 sends, after generating an output frame of the captured screen, the output frame to the parent data terminal 2-1 via the communication unit 27 (step S5).

The output frame synthesizing unit 25 of the parent data terminal 2-1 synthesizes, at updating timing of a display frame, output frames included in the display frame (step S6).

The display frame generation unit 26 of the parent data terminal 2-1 generates display frames that are to be projected by the display devices 3 respectively (step S7), and delivers them to the corresponding display devices 3 (step S8).

Thereafter, processes of step S5 to step S8 are repeated until the end of the projection is requested by the operation by the user.

Here, in step S1, instead of the case in which the operation unit 21 of each of the data terminals 2 is operated by the user, the process of step S3 may be started when the user operates the operation unit 21 of the parent data terminal 2-1.

Figure 6:
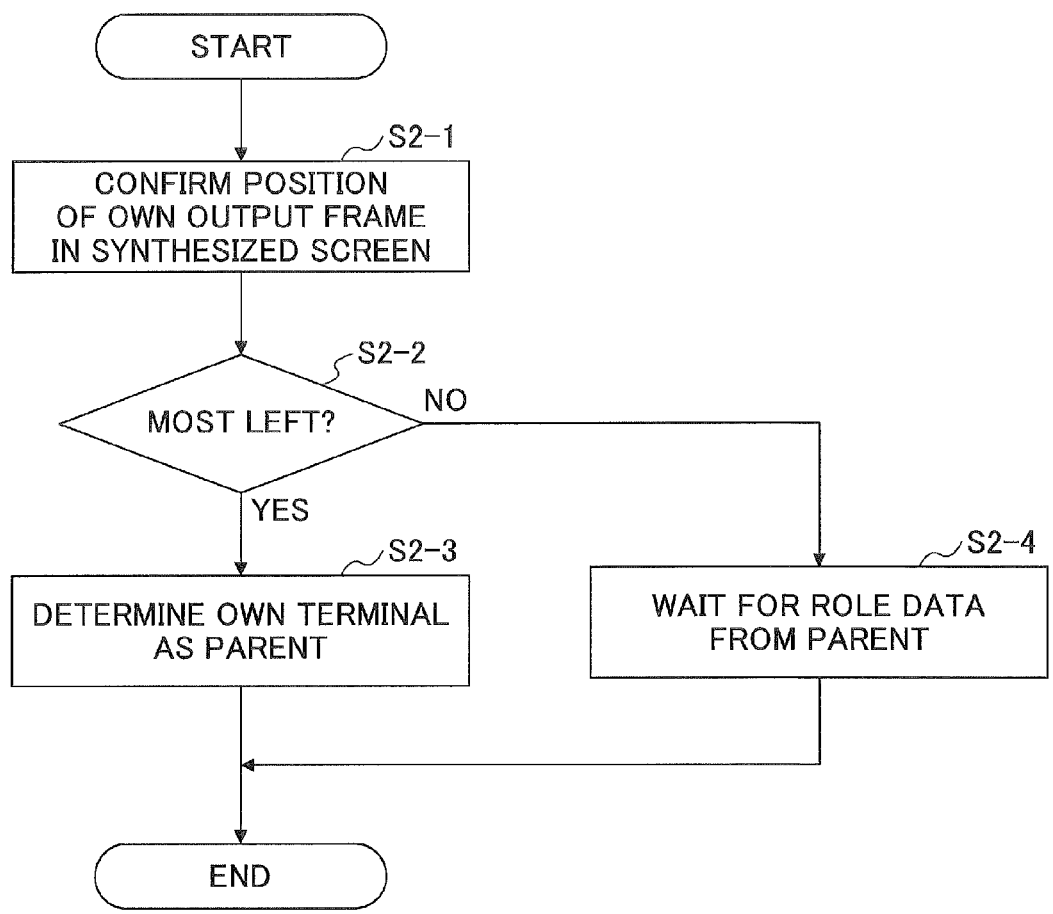
FIG. 6 is a flowchart of processes of determining a parent-child relationship.

FIG. 6 is a flowchart of processes of determining the parent-child relationship in step S2 of FIG. 5A. In an example of FIG. 6, the parent-child relationship between the data terminals 2 is determined based on the screen position of the output frame of each of the data terminals 2 set in the screen position setting unit 22. For example, the data terminal 2 (the data terminal 2-1 of FIG. 1) whose output frame is positioned most left in the synthesized single large screen becomes a parent.

First, in each of the data terminals 2, the parent-child terminal determining unit 23 confirms the position of the output frame generated by capturing the screen in the synthesized screen (step S2-1). Then, whether the position is the most left is determined (step S2-2), and if so (YES in step S2-2), the parent-child terminal determining unit 23 determines that the respective data terminal 2 is a parent (step S2-3). On the other hand, if the position is not the most left (NO in step S2-2), the parent-child terminal determining unit 23 waits for the role data sent from the parent data terminal (step S2-4).

Figure 7:
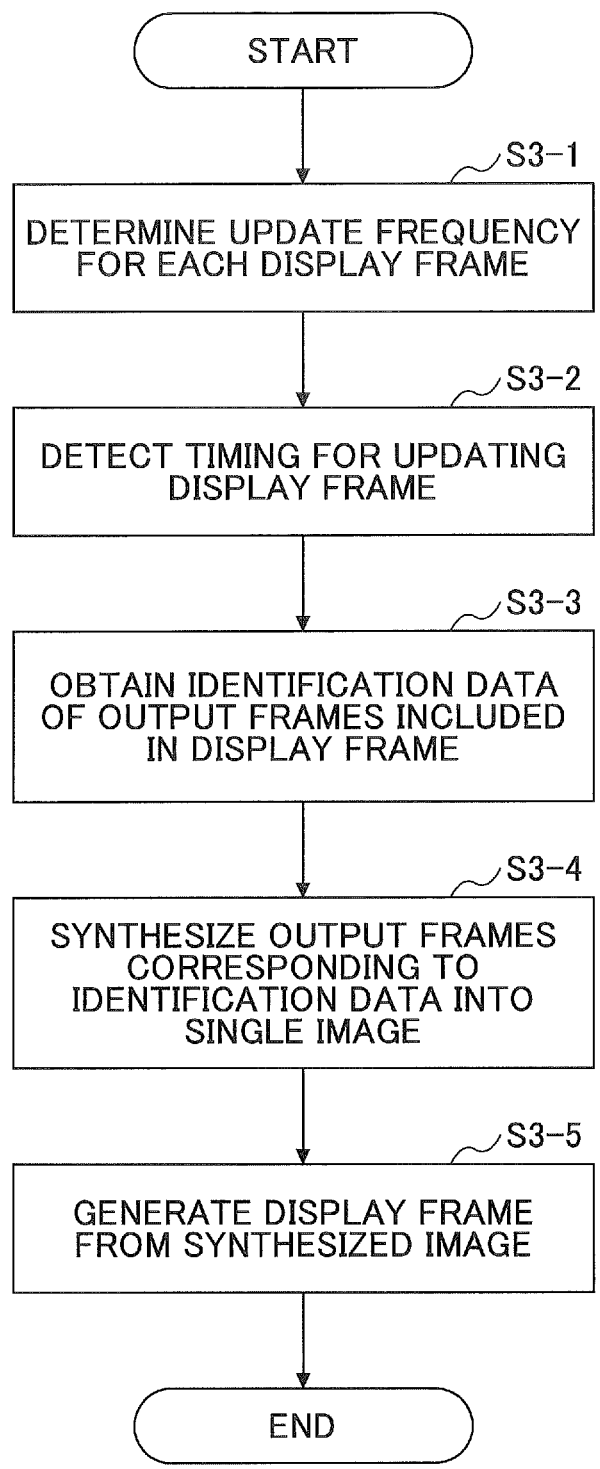
FIG. 7 is a flowchart of processes of generating display frames of the first embodiment.

FIG. 7 is a flowchart of processes of generating the display frames of step S7 and step S8 of FIG. 5B.

The update frequency determining unit 29 of the parent data terminal 2-1 determines update frequency for each of the display frames based on the screen position data illustrated in FIG. 3A to FIG. 3C (step S3-1). Then, upon detecting timing for updating each of the display frames, the update frequency determining unit 29 sends identification data of the respective display frame to the output frame synthesizing unit 25 (step S3-2).

Based on the identification data of the display frame received from the update frequency determining unit 29, the output frame synthesizing unit 25 obtains identification data of the output frame a part of or the entirety of which is included in a range of the respective display frame based on the screen position data illustrated in FIG. 3A to FIG. 3C (step S3-3). Then, the output frame synthesizing unit 25 obtains the output frame corresponding to the identification data, among the output frames received from the child data terminals 2-2 and 2-3, and stored in the parent data terminal 2-1. When identification data of the plurality of output frames are obtained, in other words, when the plurality of output frames are included in the respective display frame, the output frame synthesizing unit 25 synthesizes the plurality of output frames to a single image (step S3-4). Then, the display frame generation unit 26 generates the respective display frame by extracting (cutting) an image of a range of the display frame from the synthesized image (step S3-5).

Here, instead of the above described step S3-3 and step S3-4, all of the output frames may be synthesized into a single image, and each of the display frames may be extracted from the synthesized single image in order.

Here, each of the output frames sent from each of the child data terminals 2-2 and 2-3 to the parent data terminal 2-1 may be in a static image format such as JPEG or the like, or may be in a dynamic image format such as MPEG or the like and an output frame in a static image format may be generated at the parent data terminal 2-1.

The present invention is not limited to the above described embodiment, and the screen position setting unit 23, the output frame synthesizing unit 25 and the display frame generation unit 26 may be provided in a server, which is not illustrated in the drawings, instead of the parent data terminal 2-1. Further, in such a case, the multi-projection system 1 may include a plurality of servers and any functional units may be provided in any servers.

In the first embodiment, the single data terminal 2-1 and the other plurality of data terminals 2-2 and 2-3 are connected. Furthermore, the single data terminal 2-1 and the plurality of display devices 3 are also connected. Thus, a dynamic content such as a desk top screen or the like output by each of the plurality of data terminals 2 can be displayed as a single large screen by the plurality of display devices 3 even when the number of the data terminals 2 and the number of the display devices 3 are different.

Further, the position or the size in the single large screen at which each content output from each of the data terminals 2 may be arbitrarily changed by changing the setting to the data terminal 2.

Further, according to the multi-projection system disclosed in Patent Document 1, an image output from each of the computers and projected by each of the projectors needs to include an overlapping area that overlaps with another image output from another computer. Thus, it is impossible to align a plurality of screens each displayed by each of the computers such as a desk top screen or the like of the respective computer as a single large screen.

On the other hand, according to the first embodiment, the single data terminal 2-1 is connected to other plurality of data terminals 2-2 and 2-3, and is further connected to the plurality of display devices 3. Thus, even when projectors are used as the display devices 3, it is possible to generate a display frame including an image of an area that overlaps with another display frame and it is possible to display dynamic contents such as desk top screens or the like output from the plurality of data terminals, respectively, as a single large screen by the plurality of projectors. Further, by using the projector as the display device 3, compared with a case when the display device 3 including a frame portion at edges in a display screen such as a liquid crystal display or the like, it is possible to display a single large screen that does not include the frame portions in the screen.

Further, as only the output frames included in the respective display frame are synthesized in the above described step S3-3 and step S3-4, a memory amount necessary for each process can be reduced.

Further, by generating and projecting the display frame in accordance with the update frequency for each of the display frames, is it possible to increase the update frequency for only a content for which the surface smoothness is necessary, process load of the parent data terminal 2-1 can be reduced.

SECOND EMBODIMENT

Figure 8:
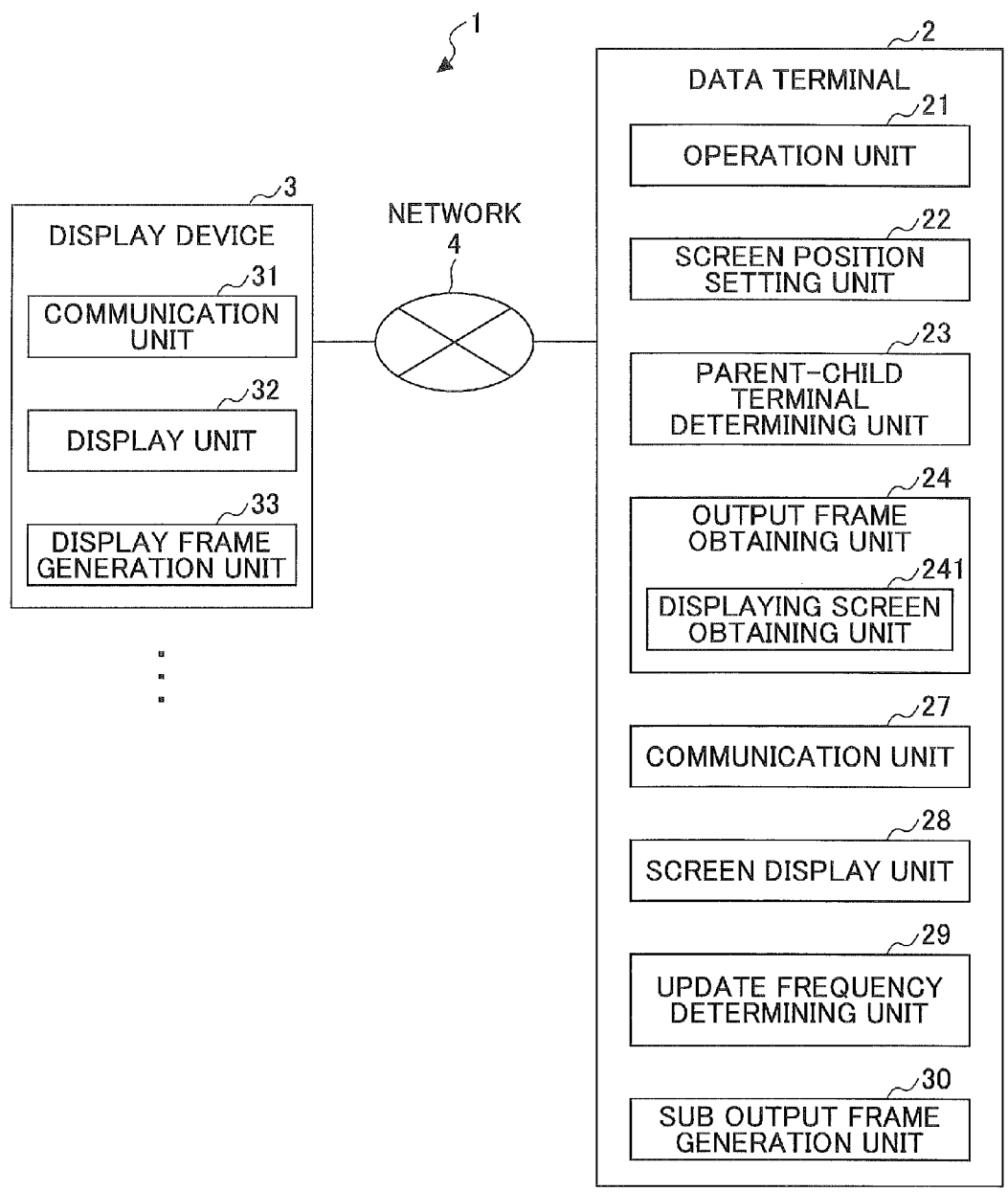
FIG. 8 is a view illustrating a structure of a multi-projection system of a second embodiment.

FIG. 8 is a view illustrating a structure of the multi-projection system 1 of the second embodiment. FIG. 9 is a view illustrating an example of the second embodiment in which display frames are generated from output frames.

In the first embodiment, the parent data terminal 2-1 includes the output frame synthesizing unit 25 and the display frame generation unit 26. However, in the second embodiment, the structure of the multi-projection system 1 is different from that of the first embodiment in that each of the display devices 3 includes a display frame generation unit 33 and each of the parent and child data terminals 2 includes a sub output frame generation unit 30.

The communication unit 27 of the parent data terminal 2-1 delivers update frequency for each of the display frames determined by the update frequency determining unit 29, and the screen position data previously set in the screen position setting unit 22 to each of the child data terminals 2-2 and 2-3.

Further, in each of the parent and child data terminals 2, the sub output frame generation unit 30 generates an image that becomes a part of the display frame. The communication unit 27 of each of the parent and child data terminals 2 sends the image generated in the sub output frame generation unit 30, data of the position of the output frame and data of the position of the display frame to the display device 3 corresponding to the display frame.

The sub output frame generation unit 30 of each of the data terminals 2 determines whether the output frame output from the respective data terminal 2 is to be divided into a plurality of display frames based on the screen position data illustrated in FIG. 3A and FIG. 3B. Then, when the output frame is to be divided (the output frame 2, for example), as illustrated in (B) of FIG. 9, the sub output frame generation unit 30 generates images which become a part of each of the display frames from the respective output frame.

For the example illustrated in FIG. 3A and FIG. 3B, positions of lower left and upper right pixels of the image corresponding to the output frame 2 are set as (1921,0), (3840,1080). Similarly, positions of lower left and upper right pixels of the display frame 1 are set as (0,0), (2900, 1080) and positions of lower left and upper right pixels of the display frame 2 are set as (2861,0), (5760,1080). This means that the output frame 2 is to be divided into the display frame 1 and the display frame 2.

Thus, as illustrated in (C) of FIG. 9, the display frame 1 includes the entirety of the output frame 1 and a part of the output frame 2. Similarly, the display frame 2 includes a part of the output frame 2 and the entirety of the output frame 3.

Here, the output frame 1 is output by the data terminal 2-1 and whose image is generated by the data terminal 2-1. The output frame 2 is output by the data terminal 2-2 and whose images are generated by the data terminal 2-2. The output frame 3 is output by the data terminal 2-3 and whose image is generated by the data terminal 2-3.

Positions of lower left and upper right pixels of the image generated by the data terminal 2-2 from the output frame 2 and that becomes a part of the display frame 1 are (1921,0), (2900,1080) of the output frame 2 (see (B) of FIG. 9). Similarly, positions of lower left and upper right pixels of an image generated by the data terminal 2-2 from the output frame 2 and that becomes a part of the display frame 2 are (2861,0), (3840,1080) of the output frame 2 (see (B) of FIG. 9).

Referring back to FIG. 8, the display frame generation unit 33 of the display device 3 synthesizes the received images to generate a synthesized display frame, and the display unit 32 projects the synthesized display frame.

FIG. 10A and FIG. 10B are sequence diagrams of the multi-projection system 1 of the second embodiment. Although boxes of units are given only numerals and names of the units are not illustrated in the boxes in FIG. 10A and FIG. 10B, the boxes with numerals correspond to the units as illustrated in FIG. 8 and described in the specification.

With reference to FIG. 10A, step S1 to step S3 are the same as those of FIG. 5A. After step S3, the parent data terminal 2-1 delivers the update frequency for each of the display frames determined by the update frequency determining unit 29 to each of the child data terminals 2-2 and 2-3 via the communication unit 27 (step S4-3).

Next, the parent data terminal 2-1 delivers the screen position data illustrated in FIG. 3A to FIG. 3C that are previously set in the screen position setting unit 22 to each of the child data terminals 2-2 and 2-3 via the communication unit 27 (step S4-4).

With reference to FIG. 10B, in each of the data terminals 2, the displaying screen obtaining unit 241 captures a currently displayed screen to generate the output frame (step S4-5). Then, in each of the data terminals 2, the sub output frame generation unit 30 generates a sub output frame that is an image to be included in a display frame from the output frame output from the respective data terminal 2 at update frequency of the respective display frame in which the respective output frame is included based on the screen position data of FIG. 3A to FIG. 3C (step S4-6). As described above, when the output frame is to be divided into a plurality of display frames, the sub output frame generation unit 30 extracts a corresponding part from the output frame for each of the display frames.

Then, in each of the data terminals 2, the sub output frame generation unit 30 sends the sub output frame that is to be included in the display frame and data of position of the sub output frame in the display frame to the corresponding display device 3 (step S4-7).

In each of the display devices 3, the display frame generation unit 33 synthesizes the sub output frames to generate a synthesized display frame based on the received data (step S4-8), and the display unit 32 projects the synthesized display frame (step S4-9). Thereafter, processes of step S4-5 to step S4-9 are repeated until the end of the projection is requested by the operation by the user.

Here, instead of delivering the screen position data to each of the child data terminals 2 from the parent data terminal 2, the parent data terminal 2 may determine data of area of each of the sub output frames that becomes a part of the display frame for each of the child data terminals 2 and deliver the data to each of the child data terminals 2.

Further, the data of position of each of the sub output frames in the respective display frame may be sent to the respective display device 3 from the parent data terminal 2 instead of being sent from each of the child data terminals 2 (step S4-7 in FIG. 10).

The present invention is not limited to the above described embodiment, and the screen position setting unit 23, the sub output frame generation unit 30 and the display frame generation unit 33 may be provided in a server, which is not illustrated in the drawings, instead of the data terminal 2 or the display device 3. Further, in such a case, the multi-projection system 1 may include a plurality of servers and any functional units may be provided in any servers.

In the second embodiment, as the plurality of data terminals 2 and the plurality of display devices 3 are connected in an N to M manner, an area in which the plurality of display frames overlap (the output frame 2 for the example of FIG. 3A) can be generated by a single data terminal 2. Thus, similar to the first embodiment, it is possible to generate a display frame including an image of an area that overlaps with another display frame and it is possible to display dynamic contents output from the plurality of data terminals, respectively, as a single large screen.

Further, as the communication amount between the data terminals 2 can be reduced compared with the case of first embodiment, the period necessary for displaying the screen by the display devices 3 after the output frames are output from the data terminals 2, respectively, can be reduced.

Further, by extracting an image that becomes a part of the display frame from the output frame and sending it in accordance with the update frequency for each of the display frames, shifts in display by the plurality of display devices can be reduced.

THIRD EMBODIMENT

Figure 12:
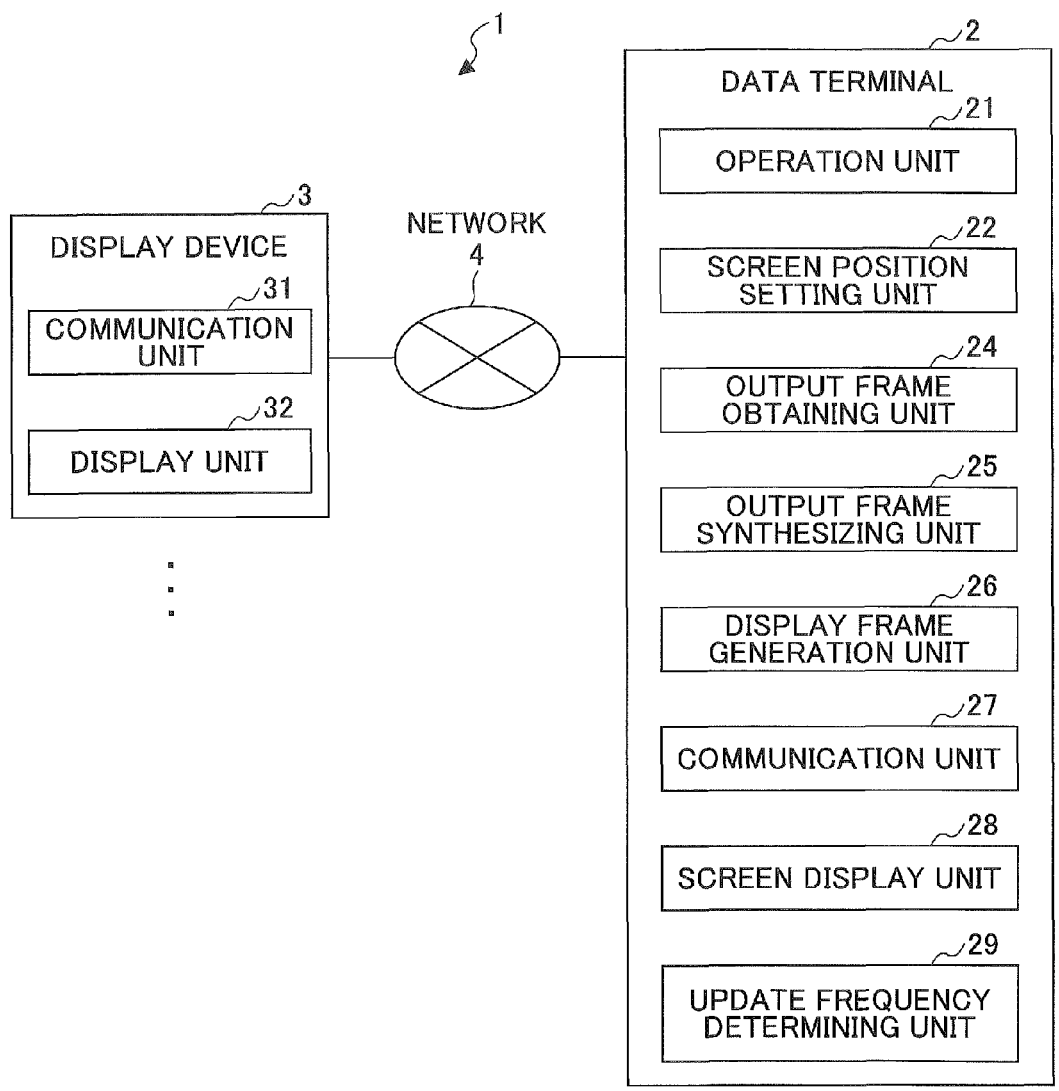
FIG. 12 is a view illustrating a structure of the multi-projection system of the third embodiment.

FIG. 11 is a schematic view of the multi-projection system 1 of the third embodiment. FIG. 12 is a view illustrating a structure of the multi-projection system 1 of the third embodiment.

In the first embodiment, the plurality of data terminals 2 each including the parent-child terminal determining unit 23 are connected, and the parent data terminal 2-1 generates the display frame by synthesizing the output frame of own and the output frames received from the child data terminals 2-2 and 2-3, respectively. However, in the third embodiment, the structure of the multi-projection system 1 is different from that of the first embodiment in that the single data terminal 2 is connected, and the data terminal 2 generates a display frame by synthesizing output frames generated from a plurality of contents obtained by the output frame obtaining unit 24.

Similar to the first embodiment, with reference to FIG. 12, the data terminal 2 includes the operation unit 21, the screen position setting unit 22, the output frame obtaining unit 24, the output frame synthesizing unit 25, the display frame generation unit 26, the communication unit 27, the screen display unit 28 and the update frequency determining unit 29.

Figure 13:
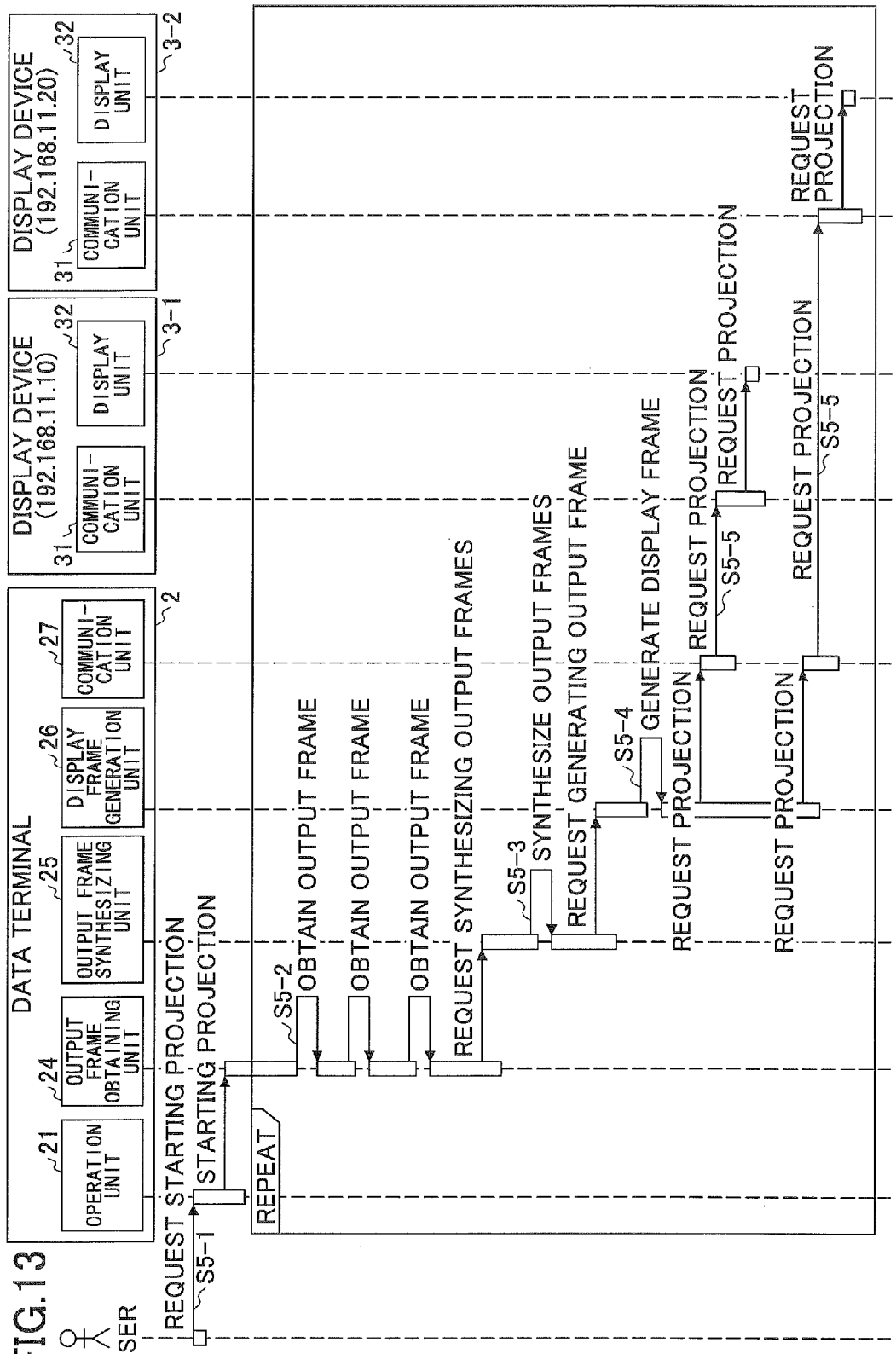
FIG. 13 is a sequence diagram of the third embodiment.

FIG. 13 is a sequence diagram of the multi-projection system 1 of the third embodiment. First, when the operation unit 21 of the data terminal 2 accepts a request of starting projection from a user (step S5-1), the output frame obtaining unit 24 obtains output frames (step S5-2). Then, the output frame synthesizing unit 25 synthesizes the output frames (step S5-3). The display frame generation unit 26 generates display frames that are projected by the display devices 3, respectively (step S5-4) and delivers the display frames to the corresponding display devices 3, respectively (step S5-5). Thereafter, processes of step S5-2 to step S5-5 are repeated until the end of the projection is requested by the operation by the user.

Figure 14:
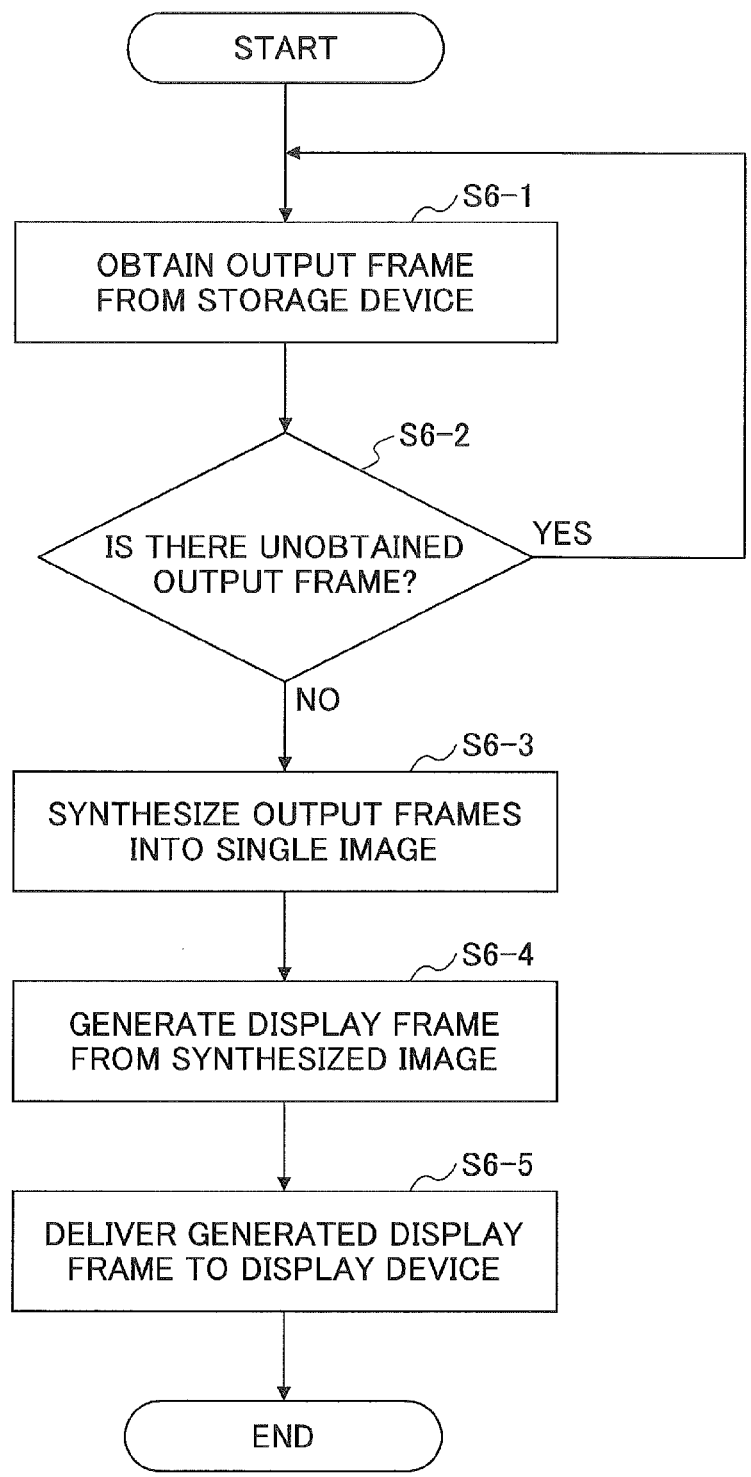
FIG. 14 is a flowchart of a data terminal of the third embodiment.

FIG. 14 is a flowchart of the data terminal 2 of the third embodiment.

First, the output frame obtaining unit 24 plays dynamic contents that are stored in an internal storage device or in an external storage device connected via a network or the like. Then, the output frame obtaining unit 24 captures played images of the contents to obtain output frames, respectively (step S6-1). Then, the output frame obtaining unit 24 determines whether unobtained output frames exist based on the screen position data of FIG. 3A to FIG. 3C (step S6-2). If the unobtained output frames exist (YES in step S6-2) the output frame obtaining unit 24 returns to step S6-1, and obtains the unobtained output frame. If not (NO in step S6-2), the output frame obtaining unit 24 synthesizes the obtained plurality of output frames to a single image based on the screen position data of FIG. 3A to FIG. 3C (step S6-3), and generates display frames from the synthesized image (step S6-4). Then, the output frame obtaining unit 24 delivers the generated display frames to the corresponding display devices 3, respectively (step S6-5).

Here, for the third embodiment, identification of each of the contents may be stored instead of the identification data of the data terminal for the screen position data of FIG. 3A or FIG. 3C.

Figure 15:
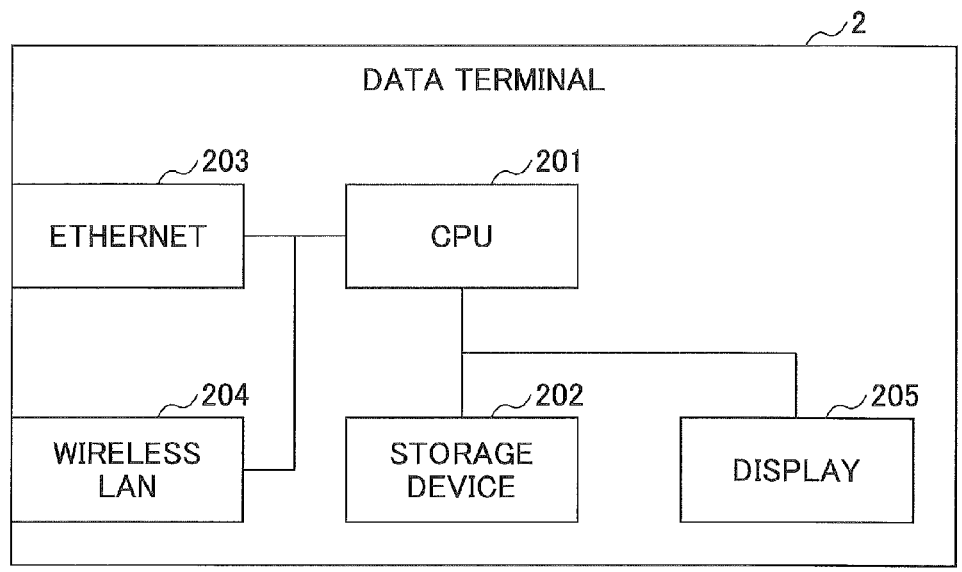
FIG. 15 is a view illustrating a hardware structure of the data terminal.

FIG. 15 is a view illustrating a hardware structure of the data terminal 2 of the embodiments.

The screen position setting unit 22, the output frame obtaining unit 24, the output frame synthesizing unit 25, the display frame generation unit 26, the update frequency determining unit 29, the sub output frame generation unit 30 and the like are actualized by a Central Processing Unit (CPU) 201 and a storage device 202. The communication unit 27 communicates with the display device 3 or the like by Ethernet (registered trademark) 203 or a wireless LAN 204. The screen display unit 28 is actualized by a display 205.

Figure 16:
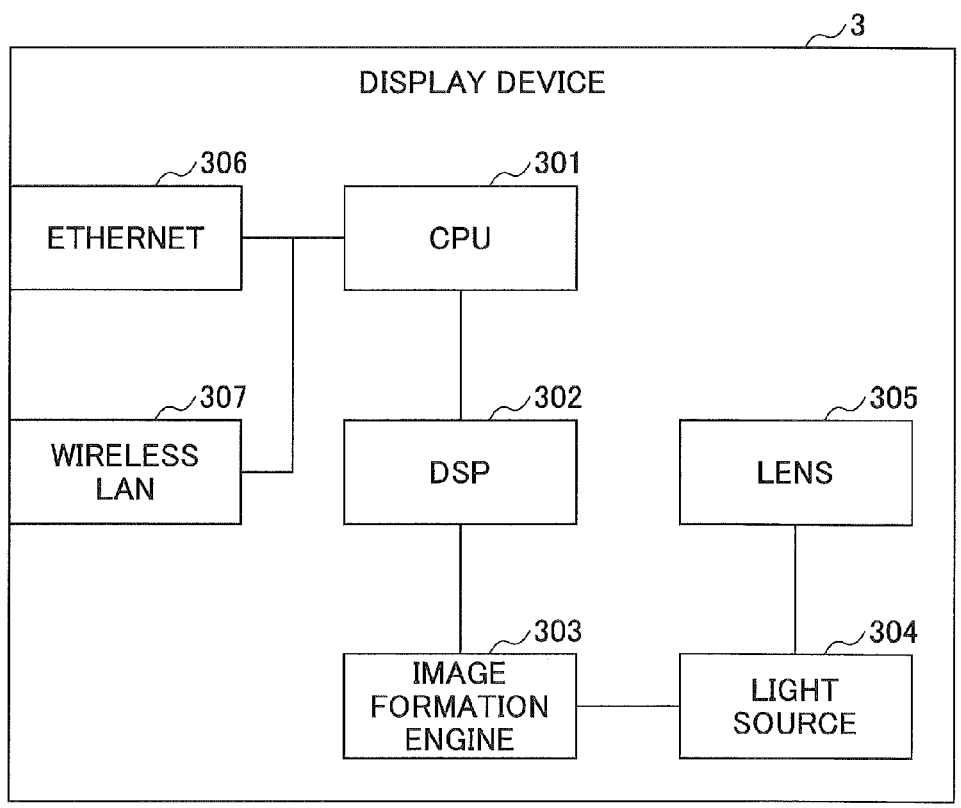
FIG. 16 is a view illustrating a hardware structure of the display device.

FIG. 16 is a view illustrating a hardware structure of the display device 3 of the embodiments.

The communication unit 31 communicates with the data terminal 2 or the like by Ethernet 306 or a wireless LAN 307. The display frame generation unit 33 is actualized by a CPU 301 or the like. The display unit 32 generates a display image by the CPU 301 or a Digital Signal Processor (DSP) 302, and projects it by an image formation engine 303, a light source 304 and a lens 305.

ALTERNATIVE EXAMPLES

According to the above described embodiments, examples in which the projector is used as the display device 3 are explained. However, the display device 3 is not limited to the projector and may be a liquid crystal display or the like. In such a case, positions of the display frames in the display frame position data of FIG. 3B may be set so that the images of the display frame 1 and the display frame 2 do not overlap, like positions of lower left and upper right pixels of the display frame 1 are (0,0), (2880,1080), and positions of lower left and upper right pixels of the display frame 2 are (2881,0), (5760,1080) or the like.

The data terminal 2 and the display device 3 may be provided in a same housing.

The structure of the system in which the data terminals 2 and the display devices 3 are connected as described in the above examples is just an example and various structure may be adapted in accordance with usages or purposes.

The data terminal 2 is an example of a data processing apparatus and the communication unit 27 is an example of an output frame obtaining unit and a sending unit.

The individual constituents of the multi-projection system 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

According to the embodiments, a multi-projection system capable of displaying dynamic contents respectively output by a plurality of data processing apparatuses as a single large screen even when the number of data processing apparatuses and the number of display devices are different is provided.

Although a preferred embodiment of the multi-projection system and the data terminal (data processing apparatus) has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

The present application is based on and claims the benefit of priority of Japanese Priority Application NO. 2015-016042 filed on Jan. 29, 2015, the entire contents of which are hereby incorporated by reference.

What is claimed is:

1. A multi-projection system configured to display a plurality of output frames as a single screen by a plurality of display frames displayed by a plurality of display devices, respectively, the system comprising:
  a screen position setting unit that sets output frame position data that is data of position of each of the output frames in the single screen when synthesizing the output frames to the single screen, and display frame position data that is data of position of each of the display frames in the single screen;
  an output frame obtaining unit that obtains a plurality of output frames;
  an output frame synthesizing unit that synthesizes the plurality of output frames based on the output frame position data;
  a display frame generating unit that generates the display frame for each of the display devices using a part of the synthesized image based on the display frame position data; and
  a plurality of display units that display the plurality of generated display frames, respectively.

2. The multi-projection system according to claim 1, wherein the output frame obtaining unit obtains a plurality of output frames from a plurality of data processing apparatuses, respectively.

3. The multi-projection system according to claim 1, wherein the output frame synthesizing unit synthesizes, for each of the display frames, only the output frames included in the respective display frame based on the output frame position data and the display frame position data.

4. The multi-projection system according to claim 1, further comprising:
  an update frequency determining unit that determines, for each of the display frames, the update frequency of the output frame whose update frequency is the highest among the output frames included in the respective display frame as frequency of the respective display frame based on the output frame position data, the display frame position data and output frame update frequency data that is data of update frequency for each of the output frames, wherein the display frame generating unit generates each of the display frames in accordance with a period based on the update frequency of the respective display frame determined by the update frequency determining unit.

5. The multi-projection system according to claim 1, wherein the display device is a projector, and
wherein the display frame position data is set such that a part of each of the display frames overlap a part of another display frame.

6. A multi-projection system configured to display a plurality of output frames as a single screen by a plurality of display frames displayed by a plurality of display devices, respectively, the system comprising:
a screen position setting unit that sets output frame position data that is data of position of each of the output frames in the single screen when synthesizing the output frames to the single screen, and display frame position data that is data of position of each of the display frames in the single screen;
an output frame obtaining unit that obtains at least an output frame;
a sub output frame generating unit that generates a plurality of sub output frames from the at least output frame to be divided into the plurality of display frames based on the output frame position data and the display frame position data, each of the sub output frames becoming a part of the respective display frame;
a display frame generating unit that generates the display frame using the sub output frames that are to be included in the display frame; and
a display unit that display the generated display frame.

7. The multi-projection system according to claim 1, wherein the plurality of output frames are output from a plurality of data processing apparatuses, respectively.

8. The multi-projection system according to claim 6, wherein the sub output frame generating unit generates the sub output frames in accordance with a period based on the update frequency of the output frame whose update frequency is the highest among the output frames included in the respective display frame.

9. The multi-projection system according to claim 6, wherein the display device is a projector, and
wherein the display frame position data is set such that a part of each of the display frames overlap a part of another display frame.

10. A data processing apparatus used for a multi-projection system configured to display a plurality of output frames as a single screen by a plurality of display frames displayed by a plurality of display devices, respectively, the data processing apparatus comprising:
a screen position setting unit that sets output frame position data that is data of position of each of the output frames in the single screen when synthesizing the output frames to the single screen, and display frame position data that is data of position of each of the display frames in the single screen;
an output frame obtaining unit that obtains a plurality of output frames;
an output frame synthesizing unit that synthesizes the plurality of output frames based on the output frame position data;
a display frame generating unit that generates the display frame for each of the display devices using a part of the synthesized image based on the display frame position data; and
a sending unit that sends the plurality of generated display frames to the corresponding display devices, respectively.

11. A data processing apparatus used for a multi-projection system configured to display a plurality of output frames as a single screen by a plurality of display frames displayed by a plurality of display devices, respectively, the data processing apparatus comprising:
a screen position setting unit that sets output frame position data that is data of position of each of the output frames in the single screen when synthesizing the output frames to the single screen, and display frame position data that is data of position of each of the display frames in the single screen;
an output frame obtaining unit that obtains at least an output frame;
a sub output frame generating unit that generates a plurality of sub output frames from the at least output frame to be divided into the plurality of display frames based on the output frame position data and the display frame position data, each of the sub output frames becoming a part of the respective display frame;
a sending unit that sends the generated sub output frames to the corresponding display devices, respectively.

* * * * *